United States Patent
Abramsohn

(10) Patent No.: US 8,665,487 B2
(45) Date of Patent: Mar. 4, 2014

(54) CALIBRATION OF HALF-TONE DENSITIES IN PRINTERS

(75) Inventor: Dennis A. Abramsohn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2675 days.

(21) Appl. No.: 10/836,894

(22) Filed: Apr. 30, 2004

(65) Prior Publication Data
US 2005/0243342 A1  Nov. 3, 2005

(51) Int. Cl.
*G06F 15/00* (2006.01)
*G03G 15/00* (2006.01)
*B41J 29/393* (2006.01)
*G06K 9/00* (2006.01)

(52) U.S. Cl.
USPC ............ 358/1.9; 358/3.06; 358/3.1; 358/3.3; 358/504; 358/534; 399/72; 399/180; 347/19; 347/131; 347/144; 382/251; 382/252

(58) Field of Classification Search
USPC ............ 358/1.9, 2.1, 3.04, 3.06, 3.08, 3, 3.1, 358/3.22, 3.23, 3.27, 3.3, 504, 489, 534, 358/536, 3.09; 345/596, 616, 63, 72, 89; 347/131, 188, 254; 382/166, 167, 252; 399/15, 49, 72
See application file for complete search history.

(56) References Cited

U.S. PATENT DOCUMENTS

| | | | |
|---|---|---|---|
| 4,203,154 A * | 5/1980 | Lampson et al. | 345/26 |
| 4,816,924 A | 3/1989 | Sekiya | |
| 4,980,726 A | 12/1990 | Aoki | |
| 4,999,673 A * | 3/1991 | Bares | 399/49 |
| 5,016,118 A * | 5/1991 | Nannichi | 358/462 |
| 5,271,095 A * | 12/1993 | Yamada | 345/428 |
| 5,416,613 A | 5/1995 | Rolleston et al. | |
| 5,491,568 A | 2/1996 | Wan | |
| 5,600,409 A | 2/1997 | Dennie | |
| 5,760,913 A | 6/1998 | Falk | |
| 5,960,232 A | 9/1999 | Cheng | |
| 6,178,007 B1 | 1/2001 | Harrington | |
| 6,178,268 B1 * | 1/2001 | Furukawa et al. | 382/260 |
| 6,191,867 B1 * | 2/2001 | Shor et al. | 358/1.9 |
| 6,256,111 B1 * | 7/2001 | Rijavec | 358/1.9 |
| 6,268,932 B1 | 7/2001 | Lee et al. | |
| 6,272,260 B1 * | 8/2001 | Furukawa et al. | 382/261 |
| 6,351,308 B1 | 2/2002 | Mestha | |
| 6,363,228 B1 | 3/2002 | Ream | |
| 6,377,766 B1 | 4/2002 | Ueno et al. | |
| 6,381,037 B1 | 4/2002 | Balasubramanian et al. | |
| 6,434,347 B2 * | 8/2002 | Nakayasu | 399/49 |
| 6,435,654 B1 | 8/2002 | Wang et al. | |
| 6,441,923 B1 | 8/2002 | Balasubramanian et al. | |
| 7,006,250 B2 * | 2/2006 | Denton et al. | 358/1.9 |
| 7,061,648 B2 * | 6/2006 | Nakajima et al. | 358/1.9 |

\* cited by examiner

*Primary Examiner* — Steven Kau

(57) ABSTRACT

Various systems, methods, and programs embodied in computer readable media are provided for calibration of at least one half-tone density in a printer. In one approach, a method is provided comprising the steps of acquiring a plurality of half-tone density values from a respective plurality of test patches generated on a belt in the printer over a period of time, each of the test patches embodying an intended half-tone density, generating a mathematically smoothed half-tone density value from the half-tone density values, and calibrating a half-tone density in the printer based upon the mathematically smoothed half-tone density value.

23 Claims, 4 Drawing Sheets

CALIBRATION OF HALF-TONE DENSITIES IN PRINTERS

BACKGROUND

In color laser printers, the problem of low density dropout may cause color inconsistency and other print abnormalities. Low density dropout refers to a condition where calibration of low half-tone densities in a laser printer ultimately causes low half-tone densities to diminish or disappear. Specifically, inaccuracies inherent in sensing the precise density of half-tone test patches generated on a transfer or media transport belt for purposes of calibration often results in incorrect calibration of half-tone densities in a laser printer. For example, in some situations a reading of a density of a particular half-tone test patch may indicate that the density is greater than its actual density appears on the media. In such case, in calibrating the half-tone density the amount of toner deposited onto the transfer belt for the respective half-tone density may be reduced, resulting in dropout in the image.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
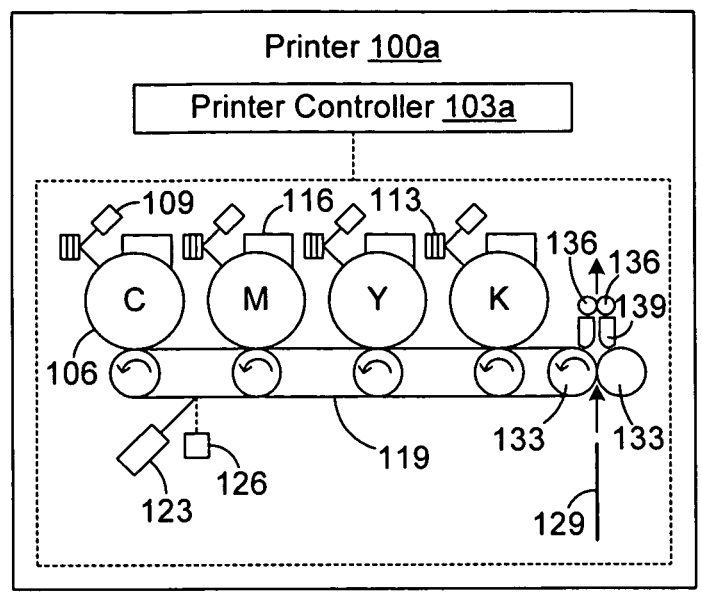
FIG. 1 is a block diagram of components within a color laser printer that uses a transfer belt and that employs a half-tone calibration according to an embodiment of the present invention.

With reference to FIG. 1, shown is an example of a laser printer 100a according to an embodiment of the present invention. While the laser printer 100a is discussed herein, it is understood that the laser printer 100a is representative of other types of printers such as ink jet printers and other types of printers to the extent that the principles discussed herein apply. The laser printer 100a includes a printer controller 103a that directs the operation of the various components in the printer 100a according to an embodiment of the present invention. In this respect, the printer 100a is a color laser printer, for example, that includes apparatus to deposit four different color toners onto a print medium during the printing process as will be described. In particular, the printer 100a includes photoconductive drums 106. Specifically four photoconductive drums 106 are included, one for each color toner employed by the printer 100a. Such colors may be, for example, Cyan, Magenta, Yellow, and Black.

Associated with each photoconductive drum 106 are a laser 109, a rotating polygonal mirror 113, and a toner cartridge 116. The printer 100a also includes a transfer belt 119 that comes into contact with each of the photoconductive drums 106. The printer 100a also includes a light source 123 that may be, for example, an infrared lamp or other appropriate lamp. The printer 100a further includes a photo sensor 126 that may be, for example, an infrared sensor or other appropriate type of sensor that senses the light generated by the light source 123. A print media 129 is pinched through a couple of transfer rollers 133 and is guided to fusing rollers 136 by paper path structures 139. It is understood that the paper path structures, and other components as shown in FIG. 1 are representative of the various types of structures that may be found in various laser printers or other types of printers as can be appreciated by those with ordinary skill in the art.

Figure 2:
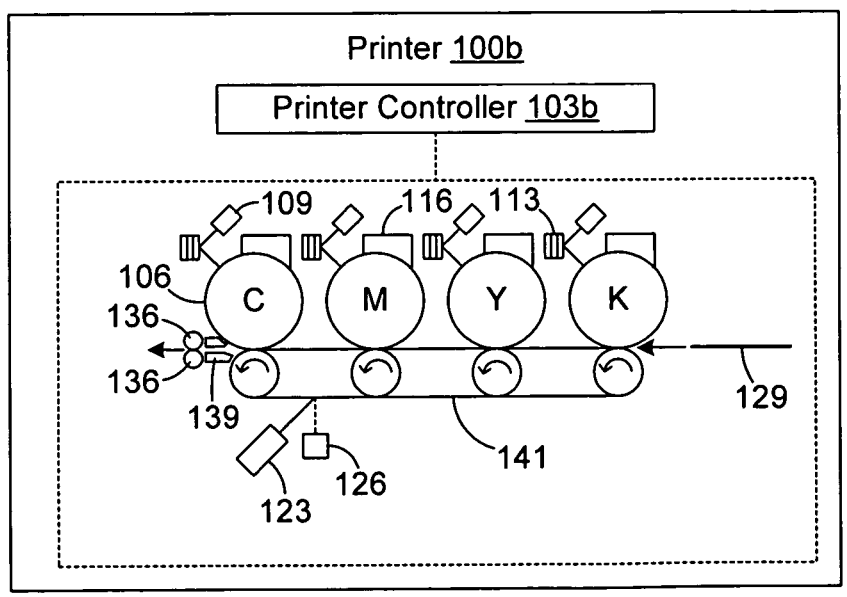
FIG. 2 is a block diagram of components within a color laser printer that uses a media transport belt and that employs a half-tone calibration according to an embodiment of the present invention.

With reference to FIG. 2, shown is an example of a laser printer 100b according to another embodiment of the present invention. To the extent that the laser printer 100b includes components that are similar to that of the printer 100a (FIG. 1), the same reference numbers are used. The laser printer 100b includes a printer controller 103b that directs the operation of the various components in the printer 100b according to an embodiment of the present invention. In this respect, the printer 100b is a color laser printer, for example, that also includes apparatus to deposit four different color toners onto a print medium during the printing process as will be described. In particular, the printer 100b includes photoconductive drums 106. Specifically four photoconductive drums 106 are included, one for each color toner employed by the printer 100b. Such colors may be, for example, Cyan, Magenta, Yellow, and Black.

Associated with each photoconductive drum 106 are a laser 109, a rotating polygonal mirror 113, and a toner cartridge 116. The printer 100b also includes a media transport belt 141 that is pressed against each of the photoconductive drums 106. The printer 100b also includes a light source 123 that may be, for example, an infrared lamp or other appropriate lamp. The printer 100b further includes a photo sensor 126 that may be, for example, an infrared sensor or other appropriate type of sensor that senses the light generated by the light source 123. A print media 129 adheres to the media transport belt 141 by way of electrostatic attraction and is ultimately released from the media transport belt 141 and guided through the fusing rollers 136 by paper path structures 139. It is understood that the paper path structures, and other components as shown in FIG. 1 are representative of the various types of structures that may be found in various laser printers or other types of printers as can be appreciated by those with ordinary skill in the art.

Next the general operation of the printers 100a/100b of FIGS. 1 and 2 is described. To begin, the printer controllers 103a/103b each direct the operation of each of the components within the printers 100a/100b in order to accomplish printing on the print media 129. Specifically, the printer controllers 103a/103b direct the operation of the lasers 109 and the rotating polygonal mirrors 113 to cause spots of differential charge to be disposed onto the respective photoconductive drums 106.

The photodischarged spots on each of the photoconductive drums 106 generate the portion of the resulting multi-color image that fall in a single color plane. The spots of differential charge may be of a very small resolution such as, for example, 600 dots per inch, although even greater or lesser resolutions may be achieved. In this respect, the spots of differential charge on each of the photoconductive drums 106 facilitate printing within a single color plane by attracting toner thereto from the respective toner cartridges 116. Thus, ultimately an image is created on each of the photoconductive drums 106 of the toner associated with each respective photoconductive drum 106 as shown.

The toner disposed on each of the photoconductive drums 106 is then transferred to the transfer belt 119 in the case of the printer 100a or transferred directly to the print media 129 in the case of the printer 100b by virtue of a transfer roller associated with each of the photoconductive drums 106. In this respect, the images generated on each of the photoconductive drums 106 are overlaid onto each other on the transfer belt 119 or the print media 129 to form a multi-chromatic image that is ultimately fused onto the print media 129. In the case of the transfer belt 119, the multi-chromatic image is deposited onto the transfer belt 119 and then transferred to the print media 129 via the transfer rollers 133 (FIG. 1). In the case of the media transport belt 141, the multi-chromatic image is deposited directly onto the print media 129 as it is shuttled by along by media transport belt 141 itself.

There are also many other configurations that may be employed to lay toner onto a print medium 129 beyond that described above as can be appreciated by those with ordinary skill in the art. The present invention is not restricted to any one configuration to accomplish the printing of images on a print media 129, where the example cited with respect to FIG. 1 provides merely one example approach to provide a framework from which the present invention may be clearly described.

The printer controllers 103a/103b also calibrate the amounts of toner that are ultimately fused onto a print medium 129 when printing various half-tone densities. In this respect, the printer controllers 103a/103b direct the creation of various test patches that embody corresponding intended half-tone densities on the transfer belt 119 or the media transport belt 141. In the printers 100a/100b, these test patches are illuminated by the light source 123 and any reflected light from the test patch is detected by the photo sensor 126. In one embodiment, the light source 123 generates infrared light as it absorbed more effectively by the toner in the test patches. When a light source 123 that generates infrared light is employed, the photo sensor 126 is an infrared sensor so as to be able to sense the infrared light that is reflected by the transfer/transport belt 119/141. One or more lenses may be employed to direct incident light from the light source 123 to a respective test patch or reflected light from a respective test patch to the photo sensor 126. Given that both the transfer belt 119 and the transport belt 141 are typically highly reflective, the denser the toner deposited in a given test patch, the amount of reflected light diminishes as the toner generally absorbs the light.

The photo sensor 126 generates a half-tone density value associated with the density of the toner disposed in the test patch on the belt 119/141. This value may be an analog voltage or current, etc., that is converted to a digital value. In this manner, a variety of test patches may be created on a respective belt 119/141, each of the test patches embodying a predefined intended half-tone density. The light source 123 and the photo sensor 126 facilitate acquiring a half-tone density value for each of the test patches disposed on the belt 119/141. The half-tone density values obtained are employed to calibrate the respective half-tone densities created by the printers 100a/100b.

To calibrate the half-tone densities created by the printers 100a/100b, the development voltages and other parameters within the printers 100a/100b may be adjusted so as to cause more or less toner to be disposed on a respective belt 119/141 within a region for a specific predefined half-tone density placed in such region. As will be discussed, from time to time, the printer controllers 103a/103b direct the creation of the respective test patches on a respective belt 119/141 and acquires the half-tone density values to facilitate calibration of the half-tone densities. Over time, multiple half-tone density values may be acquired from the performance of multiple calibration cycles for each intended half-tone density for which a test patch is created during each calibration cycle. According to various embodiments of the present invention, multiple half-tone density values are stored in the printers 100a/100b and are employed to generate mathematically smoothed half-tone density values for each half-tone density generated by the printers 100a/100b. The mathematically smoothed half-tone density values are used in adjusting various development voltages and other parameters associated with the operation of the printers 100a/100b to more accurately portray the intended half-tone densities.

Figure 3:
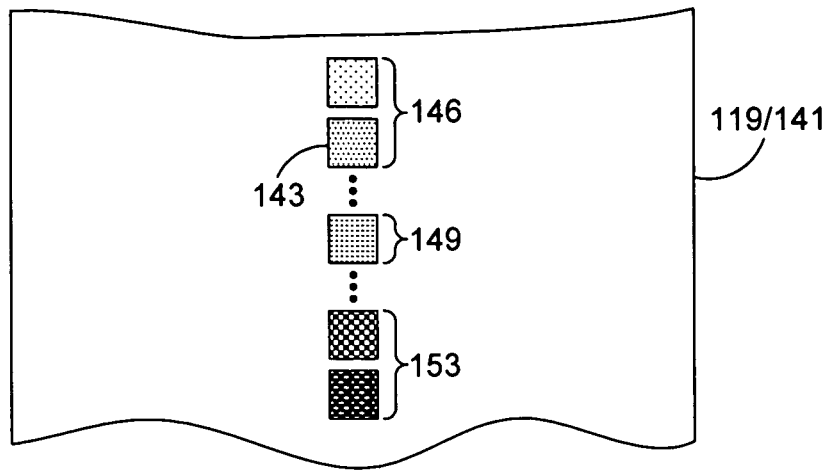
FIG. 3 is a drawing of a portion of a transfer belt or a media transport belt of the color laser printers of FIG. 1 or 2 with test patches deposited thereon according to an embodiment of the present invention.

With reference to FIG. 3, shown is a portion of either the transfer belt 119 or the media transport belt 141 with test patches 143 deposited thereon. In the case of the transfer belt 119, the test patches 143 are deposited onto the transfer belt 119 as is the usual case. However, in the case of the media transport belt 141, the test patches 143 may be deposited directly onto the media transport belt 141 and not onto print media 129.

Each of the test patches 143 expresses or embodies an intended half-tone density printed by a respective one of the printers 100a/100b. The intended half-tone densities of each of the test patches 143 varies from test patch to test patch. Specifically, for example, the half-tone density of the test patches 143 may be a relatively low density 146, a relatively medium density 149, or a relatively high density 153.

The half-tone density values that are obtained from each of the test patches 143 as described above may be subject to inaccuracy or variation due to a number of factors. For example, the actual toner laid down within a predefined test patch 143 may vary with respect to the intended half-tone density that was to be expressed. Also, the reflectivity of the belt 119/141 at the locations of the various test patches 143 may vary due to imperfections, scratches, or other damage. In addition, the light source 123 and the photo sensor 126 may inject some error and/or noise in the amount of light generated and in the readings obtained from the test patches 143 by the photo sensor 126.

Due to inaccuracy in determining half-tone density values for the respective test patches 143, it may be the case that low density drop out results or that unnecessary density enhancement occurs when the half-tone densities are calibrated. Specifically, low density drop out refers to the fact that inaccuracies in acquiring half-tone density values from test patches 143 of low density 146 lead the respective printer controllers 103a/103b to erroneously believe that the density of a respective test patch 143 is greater than its actual density. Consequently, the printer controllers 103a/103b respond during the calibration of the printers 100a/100b by adjusting development voltages and other parameters inherent in the operation of the printers 100a/100b so that less toner is disposed onto the transfer belt for the respective intended half-tone density. In some situations, the result is that little or no toner is deposited onto the print medium 129 for some half-tone densities of low density 146. Hence the name "low density dropout".

Alternatively, the inaccuracies in acquiring respective half-tone density values may lead the printer controllers 103*a*/103*b* to believe that a half-tone density of a respective test patch 143 is less than its actual density. In such cases, the printers 100*a*/100*b* may be calibrated so as to produce corresponding half-tone densities in which the density of the toner disposed thereon is unnecessarily increased or enhanced. Low density drop out and unnecessary enhancement of half-tone densities may ultimately result in color inaccuracies for images generated on the print medium 129.

To address the inaccuracies in half-tone density values acquired from test patches 143 as described above, according to one embodiment, multiple half-tone density values for each intended half-tone density generated by the respective printers 100*a*/100*b* are obtained from corresponding multiple calibration cycles. The multiple half-tone density values obtained for each intended half-tone density are mathematically smoothed so as to produce a mathematically smoothed half-tone density value. The mathematically smoothed half-tone density value is then employed to fine tune adjustments during the calibration of the respective printers 100*a*/100*b* for the respective intended half-tone density so as to ensure greater accuracy and reduce error presented by random variation in the half-tone density values.

There are several approaches that may be employed to generate the mathematically smoothed half-tone density value. For example, a straight running average may be calculated from the multiple half-tone density values. Alternatively, a weighted average of the multiple half-tone density values may be calculated as will be described. In order to perform the mathematical smoothing of multiple numbers of half-tone density values, then the half-tone density values of multiple previous calibrations for the same half-tone density would be stored in memory. Given that memory resources in typical printers are somewhat limited, then performing mathematical smoothing by calculating a weighted average may be desirable as fewer half-tone density values would have to be stored for the respective intended half-tone density as will be described.

Figure 4:
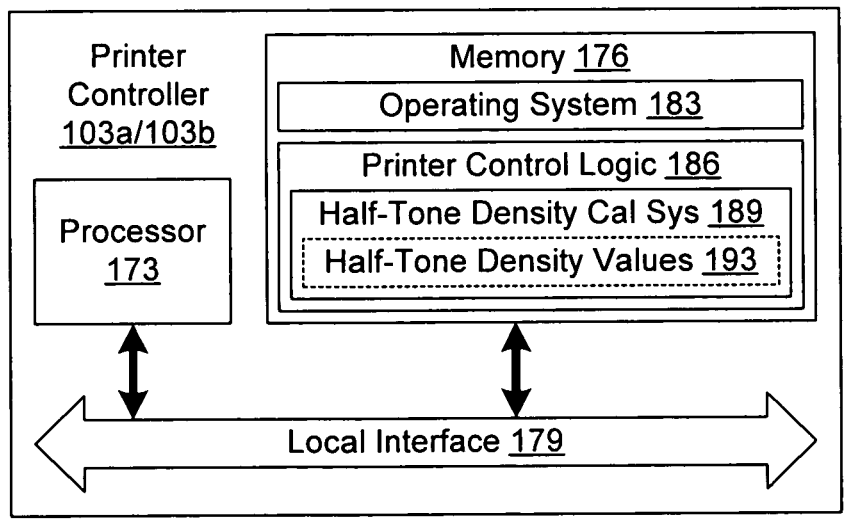
FIG. 4 is a drawing of a printer controller employed within the color laser printer of FIG. 1 or 2 that implements a half-tone calibration according to an embodiment of the present invention.

Turning then to FIG. 4, shown is an example of the respective printer controllers 103*a*/103*b* according to an embodiment of the present invention. In this respect, each of the printer controllers 103*a*/103*b* includes a processor circuit having a processor 173 and a memory 176, both of which are coupled to a local interface 179. In this respect, the local interface 179 may comprise, for example, a data bus with an accompanying control/address bus as can be appreciated by those with ordinary skill in the art.

Stored in the memory 176 and executable by the processor are an operating system 183 and printer control logic 186. The printer control logic 186 is executed to control the operation of the various components of the respective printers 100*a*/100*b* in order to orchestrate the printing of an image on the print medium 129 (FIGS. 1 and 2) as can be appreciated. A component of the printer control logic 186 is the toner density calibration system 189. Stored as a portion of the toner density calibration system 189 are a number of half-tone density values 193. In this respect, the half-tone density values 193 include multiple half-tone density values for each intended half-tone density for which a test patch 143 (FIG. 3) is generated during each calibration cycle. In this respect, the half-tone density values associated with each intended half-tone density that are obtained over multiple calibration cycles may be stored in the memory 176 in a first-in-first-out (FIFO) stack or other appropriate memory storage device.

The memory 176 is defined herein as both volatile and nonvolatile memory and data storage components. Volatile components are those that do not retain data values upon loss of power. Nonvolatile components are those that retain data upon a loss of power. Thus, the memory 176 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 173 may represent multiple processors and the memory 176 may represent multiple memories that operate in parallel. In such a case, the local interface 179 may be an appropriate network that facilitates communication between any two of the multiple processors, between any processor and any one of the memories, or between any two of the memories etc. The processor 173 may be of electrical, optical, or molecular construction, or of some other construction as can be appreciated by those with ordinary skill in the art.

The operating system 183 is executed to control the allocation and usage of hardware resources such as the memory, processing time and peripheral components in the printer controllers 103*a*/103*b*. In this manner, the operating system 183 serves as the foundation on which applications depend as is generally known by those with ordinary skill in the art.

Figure 5A:
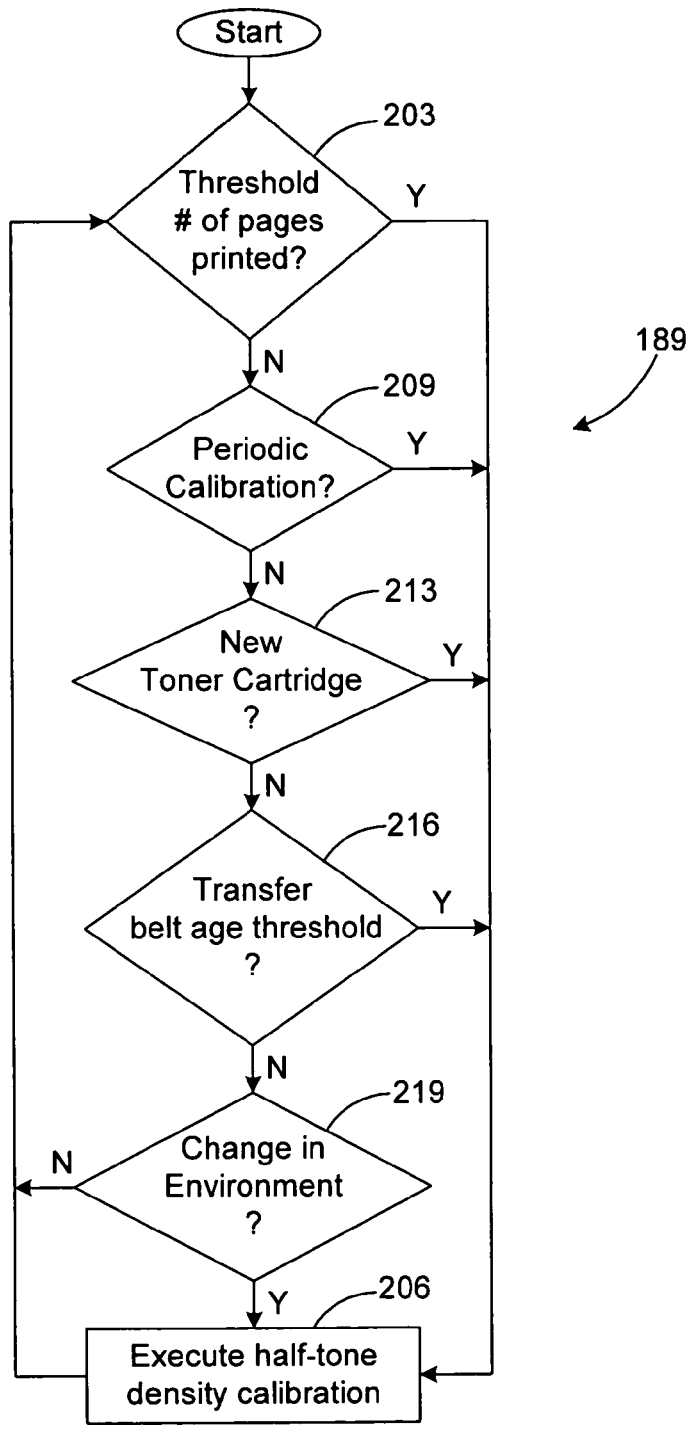
FIG. 5A is a flow chart of a first portion of printer control logic executed within the printer controller of FIG. 4 to accomplish the half-tone calibration according to an embodiment of the present invention.

With reference to FIG. 5A, shown is a flow chart that provides one example of the operation of a first portion of the half-tone density calibration system 189 according to an embodiment of the present invention. Alternatively, the flow chart of FIG. 5A may be viewed as depicting steps of an example of a method implemented in the printer controllers 103*a*/103*b* to accomplish the calibration of half-tone densities generated by the printers 100*a*/100*b* (FIG. 1). The functionality of the half-tone density calibration system 189 as depicted by the example flow chart of FIG. 5A may be implemented, for example, in an object oriented design or in some other programming architecture. Assuming the functionality is implemented in an object oriented design, then each block represents functionality that may be implemented in one or more methods that are encapsulated in one or more objects. The half-tone density calibration system 189 may be implemented using any one of a number of programming languages such as, for example, C, C++, Assembly, or other appropriate programming language.

The first portion of the half-tone density calibration system 189 depicted in FIG. 5A is executed to determine when a calibration of the half-tone densities in the respective printers 100*a*/100*b* (FIG. 1) is to be implemented. Alternatively, other events or times may be specified to implement the same.

Beginning with box 203, the toner density calibration system 189 determines whether a threshold number of pages have been printed by the printers 100*a*/100*b*. In this respect, once a threshold number of pages have been printed, then the printers 100*a*/100*b* is deemed to need calibration. This addresses the fact that the printer may need calibration after the extended use may cause parameters to move out of acceptable windows of operation, etc. If such is the case, then the half-tone density calibration system 189 proceeds to box 206.

Otherwise, the half-tone density calibration system 189 progresses to box 209 as shown.

In box 209, the half-tone density calibration system 189 determines whether a periodic calibration is to be performed by the printers 100*a*/100*b*. In this respect, a predefined period of time such as, for example, every day, every week, every month, or other time period may be predefined within the printer controllers 103*a*/103*b* for the performance of half-tone calibration as described herein. Such an approach addresses the fact that the operation of the printers 100*a*/100*b* may change over time with the environment or other factors with or without extensive use of the respective printer 100*a*/100*b*. Assuming that the periodic calibration in box 209 is to be performed, then the half-tone density calibration system 189 proceeds to box 206. Otherwise, the half-tone density calibration system 189 proceeds to box 213.

In box 213, the half-tone density calibration system 189 determines whether a new toner cartridge has been placed into the respective printer 100*a*/100*b*. In this respect, such would be the case, for example, if a user replaced an old or empty toner cartridge 116 (FIG. 1) from the printers 100*a*/100*b*. In such case, then recalibration of the half-tone densities would be recommended as some changes in various process factors within the printers 100*a*/100*b* might occur in laying down various half-tone densities due to the use of a new toner cartridge, etc. However, due to the fact that a new toner cartridge has been placed in the respective printer 100*a*/100*b*, the previously stored half-tone density values obtained from previous calibration cycles are no longer applicable to the current condition of the printer. In order to address this circumstance, the half-tone density calibration system 189 will acquire multiple half-tone density values for each test patch to create a backlog of half-tone density values from which mathematically smoothed half-tone density values may be calculated. If a new cartridge has been placed in the respective printer 100*a*/100*b*, a flag may be set or other indication in the half-tone density calibration system 189 so that it can take appropriate steps to generate a backlog of measured half-tone density values for the new toner cartridge. Thus, assuming that a toner cartridge removal has been detected in box 213, then the half-tone density calibration system 189 proceeds to box 206. Otherwise, the half-tone density calibration system 189 progresses to box 216.

In box 216, the half-tone density calibration system 189 determines whether the belt 119/141 has reached a predefined age threshold requiring a calibration of half-tone densities to be performed. In this respect, calibration may be recommended due to the fact that imperfections such as scratches, discolorations or other degradation of the respective belt 119/141 (FIG. 1) may occur during the life cycle of the printer, thereby altering the way toner is disposed onto the belt 119/141 or altering the way that light from the light source 123 may reach the photo detector 126. Note that there may be several different age benchmarks or thresholds at which time a calibration is performed as can be appreciated by those with ordinary skill in the art. Assuming that a belt age threshold has been detected in box 216, then the half-tone density calibration system 189 proceeds to box 206. Otherwise, the half-tone density calibration system 189 proceeds to box 219.

Next, in box 219, the half-tone density calibration system 189 determines whether a predefined change in the environment surrounding the respective printer 100*a*/100*b* has occurred such that a calibration of the half-tone densities within the printers 100*a*/100*b* is deemed necessary. In this respect, the change in environment might be, for example, a threshold change in the humidity, temperature, or other factor in the environment around the respective printer 100*a*/100*b*. Assuming that the threshold change in the environment has occurred in box 219, then the half-tone density calibration system 189 proceeds to box 206. Otherwise, the half-tone density calibration system 189 reverts back to box 203.

Assuming that the half-tone density calibration system 189 has reached box 206, then a half-tone density calibration cycle is executed in the printed 100. In this respect, such a calibration may be performed with calibration of other parameters of the printers 100*a*/100*b* as can be appreciated. Thereafter, the half-tone density calibration system 189 reverts back to box 203.

Figure 5B:
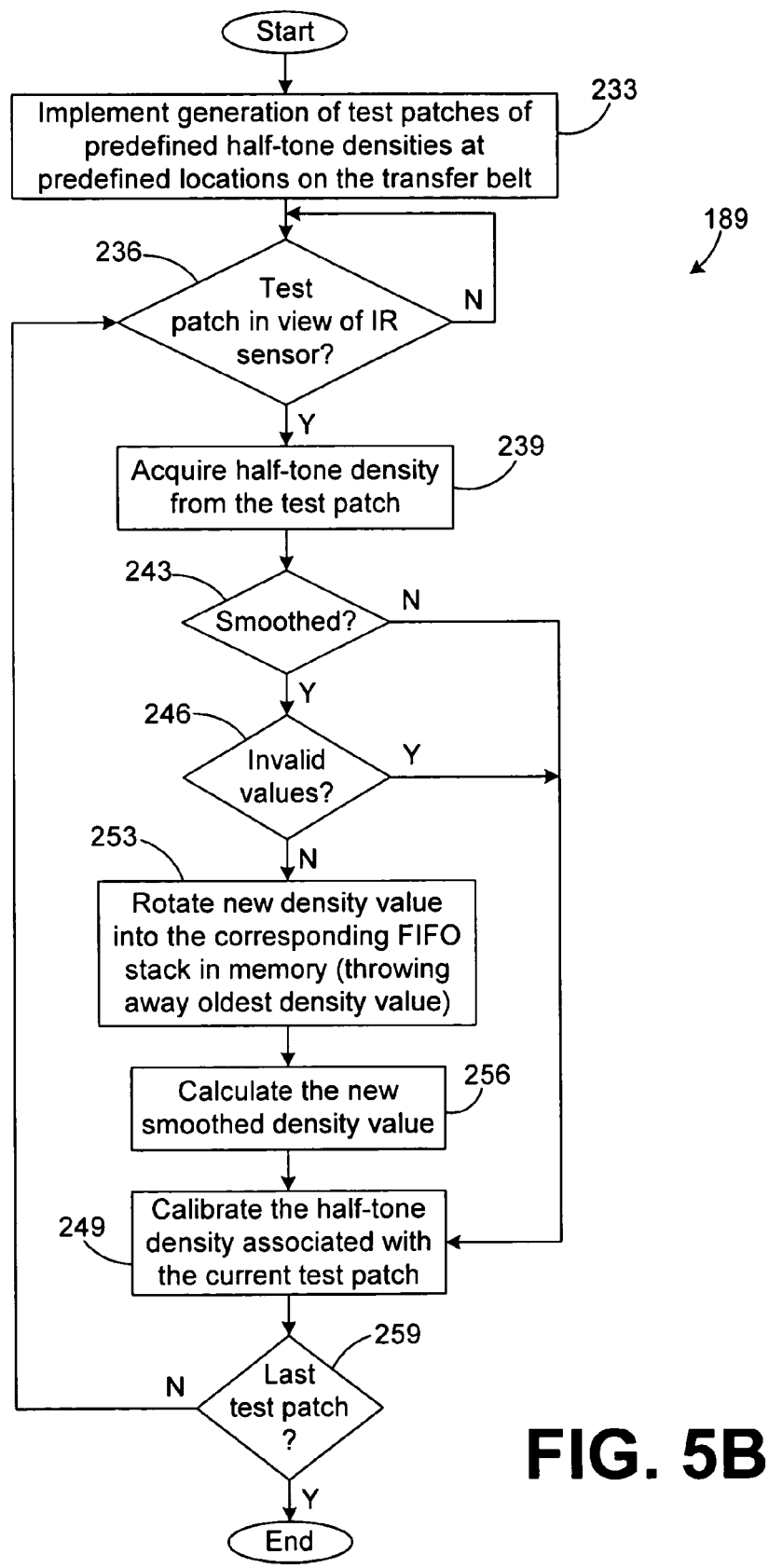
FIG. 5B is a flow chart of a second portion of printer control logic executed within the printer controller of FIG. 4 to accomplish the half-tone calibration according to an embodiment of the present invention.

With reference to FIG. 5B, shown is a flow chart that provides one example of the operation of a second portion of the half-tone density calibration system 189 according to an embodiment of the present invention. Alternatively, the flow chart of FIG. 5B may be viewed as depicting steps of an example of a method implemented in the printer controllers 103*a*/103*b* to accomplish the calibration of half-tone densities generated by the printers 100*a*/100*b* (FIG. 1). The functionality of the half-tone density calibration system 189 as depicted by the example flow chart of FIG. 5B may be implemented, for example, in an object oriented design or in some other programming architecture. Assuming the functionality is implemented in an object oriented design, then each block represents functionality that may be implemented in one or more methods that are encapsulated in one or more objects. The half-tone density calibration system 189 may be implemented using any one of a number of programming languages such as, for example, C, C++, Assembly, or other appropriate programming language.

Beginning with box 233, the half-tone density calibration system 189 implements the generation of the test patches 143 (FIG. 3) on the respective belt 119/141 (FIG. 3). The test patches 143 each express a predefined half-tone density and are located at specific locations on the transfer belt 119 that are subject to the view of the photo sensor 126 (FIGS. 1 and 2). Thereafter, in box 236, the half-tone density calibration system 189 waits until one of the test patches 143 has moved within the view area of the photo sensor 126 so that an appropriate half-tone density value may be acquired from the sensor 126 associated with the respective test patch 143. Assuming that a test patch 143 has moved into the view area of the photo sensor 126 in box 236, then the half-tone density calibration system 189 proceeds to box 239 in which the half-tone value associated with the test patch 143 is acquired.

In this respect, the printer controllers 103*a*/103*b* may read a value stored in an appropriate register that is linked to the photo sensor 126. In this respect, the photo sensor 126 may generate an analog signal proportional to the amount of light detected that is converted to a digital value that is stored in such register. Once the half-tone density value is acquired in box 239, then the half-tone density calibration system 189 proceeds to box 243 in which it is determined whether the current half-tone density value is to be mathematically smoothed with a number of previously acquired half-tone density values stored in the memory 176 (FIG. 4) as the half-tone density values 193 (FIG. 4). If so, then the half-tone density calibration system 189 proceeds to box 246. Otherwise, the half-tone density calibration system 189 progresses to box 249.

In this respect, for those half-tone densities that are to be mathematically smoothed, the half-tone density calibration system 189 acquires half-tone density values from the respective test patches 143 and performs the respective calculation. For example, the half-tone density values may be averaged with the previous half-tone density values obtained for the same test patches 143 on previous calibration cycles over a period of time. Either a straight average or a weighted average may be calculated. Alternatively, there may be other half-tone densities for which it is deemed that averaging is not necessary due to the fact that inaccuracies are less important or less consequential such as, for example, higher density 153 (FIG. 2) half-tone densities. Thus, a number of half-tone density values may be acquired for which the calibration of the respective half-tone density is performed with the half-tone density value itself rather than mathematically smoothing the multiple half-tone density values.

Assuming that the half-tone density value acquired in box 239 is to be mathematically smoothed as determined in box 243, then in box 246, the half-tone density calibration system 189 determines whether the previously stored half-tone density values are valid and may be employed to calculate the mathematically smoothed half-tone density value. The previously stored values may be invalid, for example, if a new toner cartridge has been placed in the respective printer 100a/100b. If the previously stored values are valid, then the half-tone density calibration system 189 proceeds to box 253. Otherwise, the half-tone density calibration system 189 jumps to box 249.

In box 253 the new half-tone density value is rotated into the corresponding first-in-first-out stack (FIFO) or stored in some other memory location. In this respect, the oldest corresponding half-tone density value stored for the respective test patch 143 expressing the corresponding half-tone density generated by the printers 100a/100b is thrown out to make room for the new half-tone density value acquired. Thereafter, in box 256 the new mathematically smoothed half-tone density value is calculated based upon the half-tone density values currently stored in the FIFO stack.

As stated above, in calculating the mathematically smoothed half-tone density value, one of many different approaches may be applied. For example, one may calculate a straight average of all of the half-tone density values stored in the memory 176 for a respective half-tone density in the printers 100a/100b. In this respect, any number of half-tone density values for each of the respective half-tone densities may be stored such as, for example, five or ten half-tone density values. However, storage of many half-tone density values for respective half-tone densities generated by the printers 100a/100b would result in the usage of significant memory space, given that multiple half-tone densities are generated by the printers 100a/100b.

Consequently, in another option, one may calculate a weighted average half-tone density value by assigning a weight to a respective number of half-tone density values stored in the memory 176. For example, one may store three total half-tone density values 193 in the memory 176 and assign a heavier weight to the most recently acquired half-tone density value 193 and a lesser weight to the remaining two half-tone density values depending on which was acquired last. In this respect, the averaged half-tone density value may be calculated using the following equation:

$$X_{AVG} = \frac{W_N X_N + W_{N-1} X_{N-1} + W_{N-2} X_{N+2} + \ldots + W_{N-M} X_{N-M}}{W_N + W_{N-1} + W_{N+2} + \ldots + W_{N-M}}.$$

where $W_N$ is the relative weight assigned to the $N^{th}$ stored half-tone density value.

In addition, other approaches to calculating a mathematically smoothed half-tone density value may be employed. Once the mathematically smoothed half-tone density value is calculated in box 256, then the half-tone density calibration system 189 proceeds to box 249 in which the half-tone density associated with the current test patch 143 is calibrated based upon the mathematically smoothed half-tone density value calculated in box 256. Thereafter, the half-tone density calibration system 189 proceeds to box 259 as shown.

Referring back to box 243, assuming that a particular half-tone density value obtained from a test patch 143 is not to be mathematically smoothed with previously acquired half-tone density values 193, then the half-tone density calibration system 189 proceeds directly to box 249 in which the half-tone density associated with the current test patch 143 is calibrated in the printers 100a/100b based solely upon the newly acquired half-tone density value. Thereafter, the half-tone density calibration system 189 proceeds to box 259.

In addition, referring back to box 246, assuming that the previously stored half-tone density values are invalid, then in box 249 the calibration is performed based solely upon the newly acquired half-tone density value. This value is then stored in the memory 176 (FIG. 4), for example, in the FIFO stack. This is repeated until all of the half-density values stored in the memory 176 are valid. In this respect, once the full complement of previously acquired half-tone density values is stored in the memory 176, then when the half-tone density calibration system 189 reaches box 246, it proceeds to box 253.

In calibrating the half-tone densities generated by the respective printer 100a/100b in box 249, the half-tone density calibration system 189 may make various adjustments that affect the operation of the respective printer 100a/100b. For example, the levels of laser exposure from the lasers 109 and development voltages are determined to produce the correct amount of toner on the transfer belt 119 or the print media 129 (held to the media transport belt 141) for each portion of any image from the lowest half-tone density to the highest half-tone density. Also, any transfer voltages may be adjusted.

Assuming that the half-tone density calibration system 189 has reached box 259, then the half-tone density calibration system 189 determines whether the most recently acquired half-tone density value has been acquired from the last of all the test patches 143 generated during the current calibration cycle. If not, then the half-tone density calibration system 189 reverts back to box 236 to obtain the next half-tone calibration value from the next test patch 143. Otherwise, the half-tone density calibration system 189 ends as shown.

Thus it is seen that the half-tone density calibration system 189 may acquire half-tone density values that are averaged with previously stored half-tone density values 193 or that are simply used directly to calibrate a respective half-tone density of the printers 100a/100b. In this respect, the half-tone densities generated by the printers 100a/100b for which an averaging of the half-tone density values is performed comprises a subset of a total number of the half-tone densities for which the calibration is performed and for which half-tone density values are acquired as described above. In this respect, for example, the half-tone densities generated by the printers 100a/100b for which the half tone density values are averaged may be, for example, those half-tone densities that are less than a predefined threshold density that is predefined within the printer controllers 103a/103b.

Although the half-tone density calibration system 189 (FIGS. 4-5B) is embodied in software or code executed by general purpose hardware as discussed above, the same may also be embodied in dedicated hardware or a combination of software/general purpose hardware and dedicated hardware. If embodied in dedicated hardware, the half-tone density calibration system 189 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 4, 5A, and 5B show the architecture, functionality, and operation of an implementation of the half-tone density calibration system 189. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5A and 5B may show a specific order of execution, it is understood that the order of execution may differ from that which is depicted. For example, the order of execution of two or more blocks may be scrambled relative to the order shown. Also, two or more blocks shown in succession in FIGS. 4A and 4B may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the half-tone density calibration system 189 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the half-tone density calibration system 189 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for calibration of at least one half-tone density in a printer, comprising the steps of:
    performing, by a controller of the printer, a plurality of calibration cycles for a predefined half-tone density over a period of time;
    acquiring :by the controller of the printer, a plurality of half-tone density values each from a respective one of a plurality of test patches each generated on a belt in the printer during a respective one of the plurality of calibration cycles over the period of time, each of the plurality of test patches embodying the predefined half-tone density;
    generating, by the controller of the printer, a mathematically smoothed half-tone density value from the plurality of half-tone density values acquired from the plurality of test patches during the performance of the plurality of calibration cycles for the predefined half-tone density over the period of time; and
    calibrating, by the controller of the printer, a half-tone density in the printer based upon the mathematically smoothed half-tone density value.

2. The method of claim 1, further comprising the step of storing the plurality of half-tone density values associated with the predefined half-tone density obtained over the plurality of calibration cycles in a memory in the printer in a first-in-first-out stack.

3. The method of claim 1, further comprising the steps of:
    acquiring, by the controller of the printer, a plurality of second half-tone density values each from a respective one of a plurality of second test patches each generated on the belt in the printer during a respective one of the plurality of calibration cycles over the period of time, each of the plurality of second test patches expressing one of a plurality of predefined half-tone densities; and
    calibrating, by the controller of the printer, a respective plurality of second half-tone densities in the printer based solely upon respective ones of the plurality of second half-tone density values.

4. The method of claim 1, wherein the step of acquiring the plurality of half-tone density values each from the respective one of the plurality of test patches each generated on the belt in the printer during a respective one of the plurality of calibration cycles over the period of time is performed for each one of a first plurality of half-tone densities, the first plurality of half-tone densities being a subset of a total number of half-tone densities generated by the printer.

5. The method of claim 4, wherein each of the first plurality of half-tone densities has a specified half-tone density of less than a predefined threshold.

6. The method of claim 1, wherein the step of generating the mathematically smoothed half-tone density value from the plurality of half-tone density values further comprises the step of calculating an average of the plurality of half-tone density values obtained for a respective test patch on previous calibration cycles over the period of time.

7. The method of claim 1, wherein the step of generating the mathematically smoothed half-tone density value from the plurality of half-tone density values further comprises the step of calculating a weighted average of the plurality of half-tone density values obtained for a respective test patch on previous calibration cycles over the period of time.

8. The method of claim 1, wherein the steps of performing, acquiring, generating, and calibrating are performed upon detecting a replacement of a toner cartridge in the printer.

9. The method of claim 1, wherein the steps of performing, acquiring, generating, and calibrating are performed upon detecting a predefined change in an environment surrounding the printer.

10. A system in a printer for half-tone calibration, comprising:
a processor circuit having a processor and a memory;
a half-tone calibration system stored in the memory and executable by the processor, the half-tone calibration system comprising:
logic that directs the performance of a plurality of calibration cycles for a same half-tone density over a period of time;
logic that directs the acquisition of a plurality of half-tone density values each from a respective one of a plurality of test patches each generated on a belt in the printer during a respective one of the plurality of calibration cycles over the period of time, each of the plurality of test patches embodying the same half-tone density;
logic that generates a mathematically smoothed half-tone density value from the plurality of half-tone density values acquired from the plurality of test patches during the performance of the plurality of calibration cycles for the same half-tone density over the period of time; and
logic that calibrates a half-tone density in the printer based upon the mathematically smoothed half-tone density value.

11. The system of claim 10, wherein the belt is a transfer belt.

12. The system of claim 10, wherein the belt is a media transport belt.

13. The system of claim 10, wherein the half-tone calibration system further comprises a first-in-first-out stack stored in the memory for storing the plurality of half-tone density values associated with the same half-tone density obtained over the plurality of calibration cycles.

14. The system of claim 10, wherein the half-tone calibration system further comprises:
logic that directs the acquisition of a plurality of second half-tone density values each from a respective one of a plurality of second test patches each generated on the belt in the printer during a respective one of the plurality of calibration cycles over the period of time, each of the plurality of second test patches expressing one of a plurality of half-tone densities; and
logic that calibrates a respective plurality of second half-tone densities in the printer based solely upon the respective ones of the plurality of second half-tone density values.

15. The system of claim 10, wherein the logic that directs the acquisition of the plurality of half-tone density values each from the respective one of the plurality of test patches each generated on the belt in the printer during a respective one of the plurality of calibration cycles over the period of time is executed for each one of a first plurality of half-tone densities, the first plurality of half-tone densities being a subset of a total number of half-tone densities generated by the printer.

16. The system of claim 15, wherein each of the first plurality of half-tone densities has a specified half-tone density of less than a predefined threshold.

17. The system of claim 10, wherein the logic that generates the mathematically smoothed half-tone density value from the plurality of half-tone density values further comprises logic that generates a weighted average of the plurality of half-tone density values obtained for a respective test patch on previous calibration cycles over the period of time.

18. A non-transitory computer-readable storage medium encoded with a computer program for half-tone calibration in a printer, comprising:
code that directs the acquisition of a plurality of half-tone density values each from a respective one of a plurality of test patches each generated on a belt in the printer during a respective one of a plurality of calibration cycles over a period of time, wherein each of the plurality of test patches embodies the same half-tone density;
code that generates a mathematically smoothed half-tone density value from the respective plurality of half-tone density values for the respective plurality of test patches acquired from the performance of the respective plurality of calibration cycles for the same half-tone density over the period of time; and
code that calibrates a half-tone density in the printer based upon the mathematically smoothed half-tone density value.

19. The non-transitory computer-readable storage medium of claim 18, further comprising a first-in-first-out stack for storing the respective plurality of half-tone density values obtained for the respective plurality of test patches each generated during the respective plurality of calibration cycles for the same half-tone density over the period of time.

20. The non-transitory computer-readable storage medium of claim 18, wherein the code that generates the mathematically smoothed half-tone density value from the respective plurality of half-tone density values further comprises code that generates a weighted average of the respective plurality of half-tone density values obtained for a respective test patch on previous calibration cycles over the period of time.

21. A system in a printer for half-tone calibration, comprising:
means for acquiring a plurality of half-tone density values each from a respective one of a plurality of test patches each generated on a belt in the printer during a respective one of a plurality of calibration cycles over a period of time, wherein each of the plurality of test patches embodies one half-tone density;
means for generating a mathematically smoothed half-tone density value from the respective plurality of half-tone density values for the respective plurality of test patches acquired from the performance of the respective plurality of calibration cycles for the one half-tone density over the period of time; and
means for calibrating a half-tone density in the printer based upon the mathematically smoothed half-tone density value.

22. The system of claim 21, further comprising a first-in-first-out stack for storing the respective plurality of half-tone density values obtained for the respective plurality of test patches each generated during the respective plurality of calibration cycles for the one half-tone density over the period of time.

23. The system of claim 21, wherein the means for generating the mathematically smoothed half-tone density value from the respective plurality of half-tone density values further comprises means for generating a weighted average of the respective plurality of half-tone density values obtained for a respective test patch on previous calibration cycles over the period of time.

* * * * *

UNITED STATES PATENT AND TRADEMARK OFFICE
CERTIFICATE OF CORRECTION

PATENT NO.       : 8,665,487 B2                                         Page 1 of 1
APPLICATION NO.  : 10/836894
DATED            : March 4, 2014
INVENTOR(S)      : Abramsohn It is certified that error appears in the above-identified patent and that said Letters Patent is hereby corrected as shown below:

In the Claim

Column 12, line 12, Claim 1, delete "acquiring :by" and insert -- acquiring, by --, therefor.

Signed and Sealed this
Tenth Day of June, 2014

Michelle K. Lee
*Deputy Director of the United States Patent and Trademark Office*